(12) United States Patent
Tang

(10) Patent No.: US 11,730,578 B1
(45) Date of Patent: Aug. 22, 2023

(54) ELECTRIC TOOTHBRUSH REPLACEMENT HEAD DEVICE

(71) Applicant: Guangdong Yingxin Technology Co., Ltd., Dongguan (CN)

(72) Inventor: Guoming Tang, Gaozhou (CN)

(73) Assignee: GUANGDONG YINGXIN TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 18/097,304

(22) Filed: Jan. 16, 2023

(51) Int. Cl.
*A61C 17/34* (2006.01)
*A61C 17/22* (2006.01)

(52) U.S. Cl.
CPC ............ *A61C 17/222* (2013.01); *A61C 17/34* (2013.01)

(58) Field of Classification Search
CPC ... A61C 17/222; A61C 17/34; A61C 17/3481; A61C 17/3418; A61C 17/3472
See application file for complete search history.

(56) References Cited

U.S. PATENT DOCUMENTS

| | | | |
|---|---|---|---|
| 7,987,544 B2* | 8/2011 | Stoeffler | A61C 17/225 15/22.1 |
| 8,813,330 B2* | 8/2014 | Grez | A61C 17/3481 29/402.01 |
| 2015/0150664 A1* | 6/2015 | Crossman | A61C 17/3472 74/96 |

* cited by examiner

*Primary Examiner* — Shay Karls
(74) *Attorney, Agent, or Firm* — Zhigang Ma

(57) ABSTRACT

An electric toothbrush replacement head device is provided, including a brush head portion, which is provided with a toothbrush handle and a toothbrush head. A rotating cover is disposed adjacent to an end of the brush head portion. A vibration assembly is disposed in the rotating cover, and includes a first fixed plate, a size of which corresponds to an inner diameter of the rotating cover. The first fixed plate is provided with a space-keeping slot therein, a square shaft thereof, and a connecting seat thereon. An end of the square shaft is connected to the brush head potion through the space-keeping slot. An opposite end of the square shaft is connected to the connecting seat. The device is designed with a simple structure, which is flexible for installation and disassembly, and more convenient for use, furthermore, improves transmission efficiency and possesses various functions.

18 Claims, 7 Drawing Sheets

ELECTRIC TOOTHBRUSH REPLACEMENT HEAD DEVICE

TECHNICAL FIELD

The disclosure relates to a field of electric toothbrush technologies and more particularly to a novel electric toothbrush replacement head device.

BACKGROUND

Electric toothbrushes are widely used because of their high efficiency, portability and good cleaning effect. The existing electric toothbrushes are mostly through the rapid rotation of the motor, and then drive the brush head to vibrate, to ensure good cleaning effect. However, internal structures of the existing electric toothbrushes are complex, too many assembly parts bring corresponding costs to production and processing of the electric toothbrush, and a destruction rate of the whole electric toothbrush is high. In addition, the rapid rotation of the motor through the transmission components to drive the brush head vibration, the instability of the internal structure is easy to cause structural damage, which in turn affects the normal use of electric toothbrush.

The current electric toothbrush on the market is difficult to remove and replace the brush head flexibly, and it is very inflexible and inconvenient to replace the toothbrush head portion. Therefore, consumers want an electric toothbrush that is more convenient to use and more flexible to install and disassemble.

SUMMARY

A main object of the disclosure is to provide a novel electric toothbrush replacement head device with simple structure, which is more flexible for installation and disassembly, more convenient for use, furthermore, improves transmission efficiency and possesses various functions.

In order to achieve the above objective, the disclosure provides a novel electric toothbrush replacement head device, including a brush head portion, which includes a toothbrush handle and a toothbrush head. A rotating cover is disposed adjacent to an end of the brush head portion, and a vibration assembly is disposed in the rotating cover.

The vibration assembly includes a first fixed plate, a size of which corresponds to an inner diameter of the rotating cover. The first fixed plate is provided with a space-keeping slot therein and a square shaft thereof. A bottom of the first fixed plate is provided with a connecting seat. A top end of the square shaft passes through the space-keeping slot to connect to the end of the brush head portion and a bottom end of the square shaft is connected to the connecting seat.

In an embodiment of the disclosure, the end of the brush head portion is provided with a square shaft mounting hole and the top end of the square shaft passes through the square shaft mounting hole to connect to the end of the brush head portion.

In an embodiment of the disclosure, the top end of the square shaft is provided with rippled first threads thereon.

In an embodiment of the disclosure, a bottom of the connecting seat is provided with a weighted iron block.

In an embodiment of the disclosure, the weighted iron block is provided with at least one magnet thereon.

In an embodiment of the disclosure, two semi-circular grooves are disposed on the bottom end of the square shaft, a top portion of the connecting seat is provided with two protruding parts matched with the two semi-circular grooves correspondingly; and the two protruding parts are respectively abutted against the two semi-circular grooves to connect the connecting seat to the bottom end of the square shaft.

In an embodiment of the disclosure, the connecting seat is provided with at least one fixed metal sheet; an end of the at least one fixed metal sheet is connected to the first fixed plate; and an opposite end of the at least one fixed metal sheet is connected to the connecting seat.

In an embodiment of the disclosure, the first fixed plate is provided with a supporter thereon; the supporter is provided with a supporter hole thereon; and the square shaft passes through the supporter hole to connect to the end of the brush head portion.

In an embodiment of the disclosure, the supporter is provided with first buckles thereon; the rotating cover is provided with circular slots therein; and the first buckles are buckled in the circular slots.

In an embodiment of the disclosure, an edge of the supporter is provided with a drainage slot.

In an embodiment of the disclosure, a back side of the first fixed plate is provided with a second fixed plate and second buckles thereon; and the second buckles are buckled on the second fixed plate.

In an embodiment of the disclosure, two of the second buckles located at a same side of the second fixed plate are provided with a positioning rib; and the positioning rib is disposed on an outside of the two second buckles.

In an embodiment of the disclosure, a soft rubber sleeve is disposed between the rotating cover and the end of the brush head portion.

Advantages of the disclosure are as follows. The disclosure includes the brush head portion, which includes the toothbrush handle and the toothbrush head; the rotating cover is disposed adjacent to the end of the brush head portion; and the vibration assembly is disposed in the rotating cover. The rotating cover is screwed on a main body of the electric toothbrush, and the vibration assembly improves transmission efficiency, as well as cleans teeth better.

The novel electric toothbrush replacement head device of the disclosure is simple in structure, with a low cost to produce, easy to disassemble and install, used more flexibly, and with a variety of functions. Therefore, the disclosure is practical, easy to use, safe, reliable, and also suitable for universal promotion and use.

BRIEF DESCRIPTION OF DRAWINGS

In order to explain embodiments of the disclosure or technical solutions in the related art more clearly, following descriptions will briefly introduce attached drawings in the embodiments or in descriptions of the related art. Apparently, the attached drawings in the following description are only some of embodiments of the disclosure. For those skilled in the art, other drawings can be obtained according to the structure shown in the attached drawings without paying creative labor.

Figure 1:
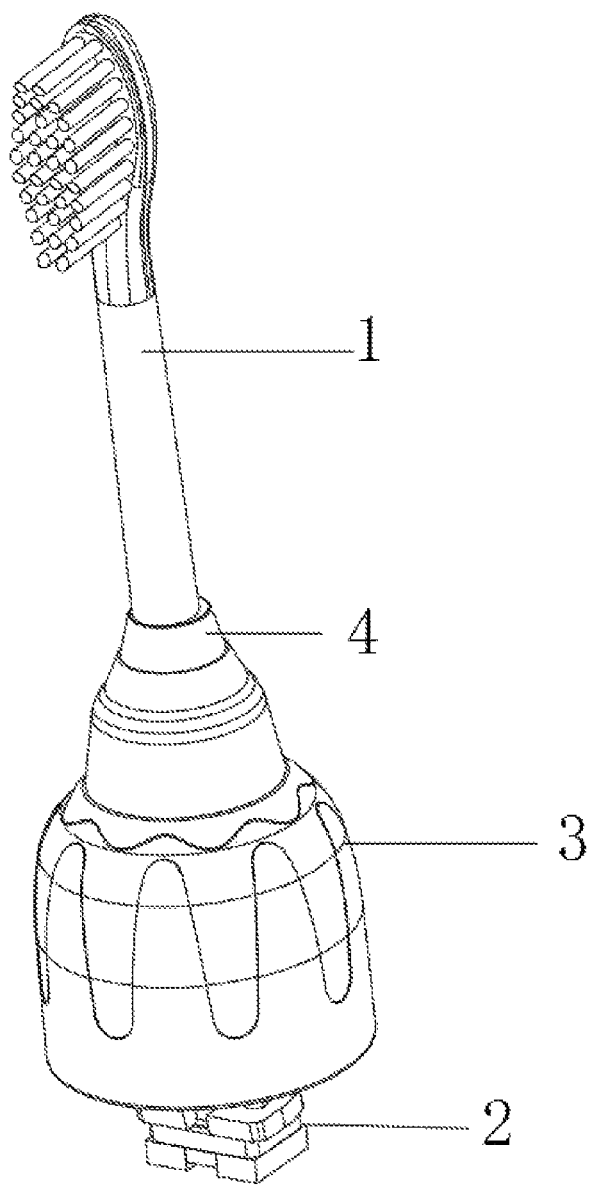
FIG. 1 illustrates a schematic structural diagram of an electric toothbrush replacement head device according to an embodiment of the disclosure.

DESCRIPTION OF REFERENCE NUMERALS 1-brush head portion; 101-toothbrush head; 102-toothbrush handle; 103-square shaft mounting hole;
2-vibration assembly; 201-square shaft; 202-first thread; 203-connecting seat; 2031-first semi-circular groove; 2032-second semi-circular groove; 204-weighted iron block; 205-magnet; 206-fixed metal sheet; 207-first fixed plate; 2071-space-keeping slot; 2072-second fixed plate; 208-supporter; 2081-supporter hole; 209-second buckle; 210-positioning rib; 211-drainage slot; 212-first buckle;
3-rotating cover; 301-circular slot; 302-second thread;
4-soft rubber sleeve;
5-main engine; 501-positioning slot; 502-installing groove.

Realization of the objective, functional features and advantages of the disclosure will be further described by combining the embodiments of the disclosure and referring to the attached drawings of the disclosure.

DETAILED DESCRIPTION OF EMBODIMENTS

The technical solutions of the embodiments of the disclosure will be clearly and completely described below in combination with the attached drawings in the embodiments of the disclosure. Apparently, the described embodiments are only some embodiments of the disclosure and not all embodiments of the disclosure. Based on the embodiment of the disclosure, all other embodiments obtained by those skilled in the art without creative work belong to the protection scope of the disclosure.

It needs to explain that all directional indications (such as up, down, left, right, front, back . . . ) in the embodiments of the disclosure are only used to explain the relative position relations, motion conditions, etc. among the components in a particular attitude (as shown in the attached drawing), if the particular attitude changes, the directional indication changes accordingly.

In the disclosure, unless otherwise specified and limited, the terms "connected", "fixed", etc. shall be understood in a broad sense. For example, "fixed" may be a fixed connection, a detachable connection, or an integrated connection; it can be a mechanical connection or an electrical connection; it may be a direct connection or an indirect connection through an intermediate medium; it may be a connection between two elements or an interaction between two elements, unless otherwise specified. For those skilled in the art, the specific meaning of the above terms in the disclosure can be understood according to the specific circumstances.

In addition, if there is a description of "first", "second", etc., in the embodiments of the disclosure, the description of "first", "second", etc., is only used to describe purposes, cannot be understood as indicating or implying its relative importance or implicitly indicating the number of technical characteristics indicated. Thus, a feature defining "first" or "second" may include at least one of the features explicitly or implicitly. Additionally, the meaning of "and/or" in the full text, includes three parallel schemes, taking "A and/or B" as an example, including a scheme "A" or a scheme "B", or a scheme "A and B". In addition, the technical solutions between various embodiments may be combined with each other, but must be based on the achievement of those skilled in the art. When a combination of technical solutions appears contradictory or cannot be realized, the combination shall be considered not to exist and not to be within the protection scope of the disclosure.

The disclosure provides a novel electric toothbrush replacement head device.

Embodiment 1

Reference to FIGS. 1-4, in an embodiment of the disclosure, the novel electric toothbrush replacement head device includes a brush head portion 1, which includes a toothbrush handle 102 and a toothbrush head 101; a rotating cover 3 is disposed adjacent to an end of the brush head portion 1; and a vibration assembly 2 is disposed in the rotating cover 3.

The vibration assembly 2 includes a first fixed plate 207, a size of which corresponds to an inner diameter of the rotating cover 3. In an illustrated embodiment of the disclosure, the first fixed plate 207 is shaped as a disc, the rotating cover 3 is shaped as a Buddhist temple bell, and the first fixed plate 207 is abutted against an inner wall of the rotating cover 3.

The first fixed plate 207 is provided with a space-keeping slot 2071 therein and a square shaft 201 thereof; a bottom of the first fixed plate 207 is provided with a connecting seat 203; a top end of the square shaft 201 is connected to the end of the brush head portion 1 through the space-keeping slot 2071; and a bottom end of the square shaft 201 opposite to the top end is connected to the connecting seat 203.

Figure 2:
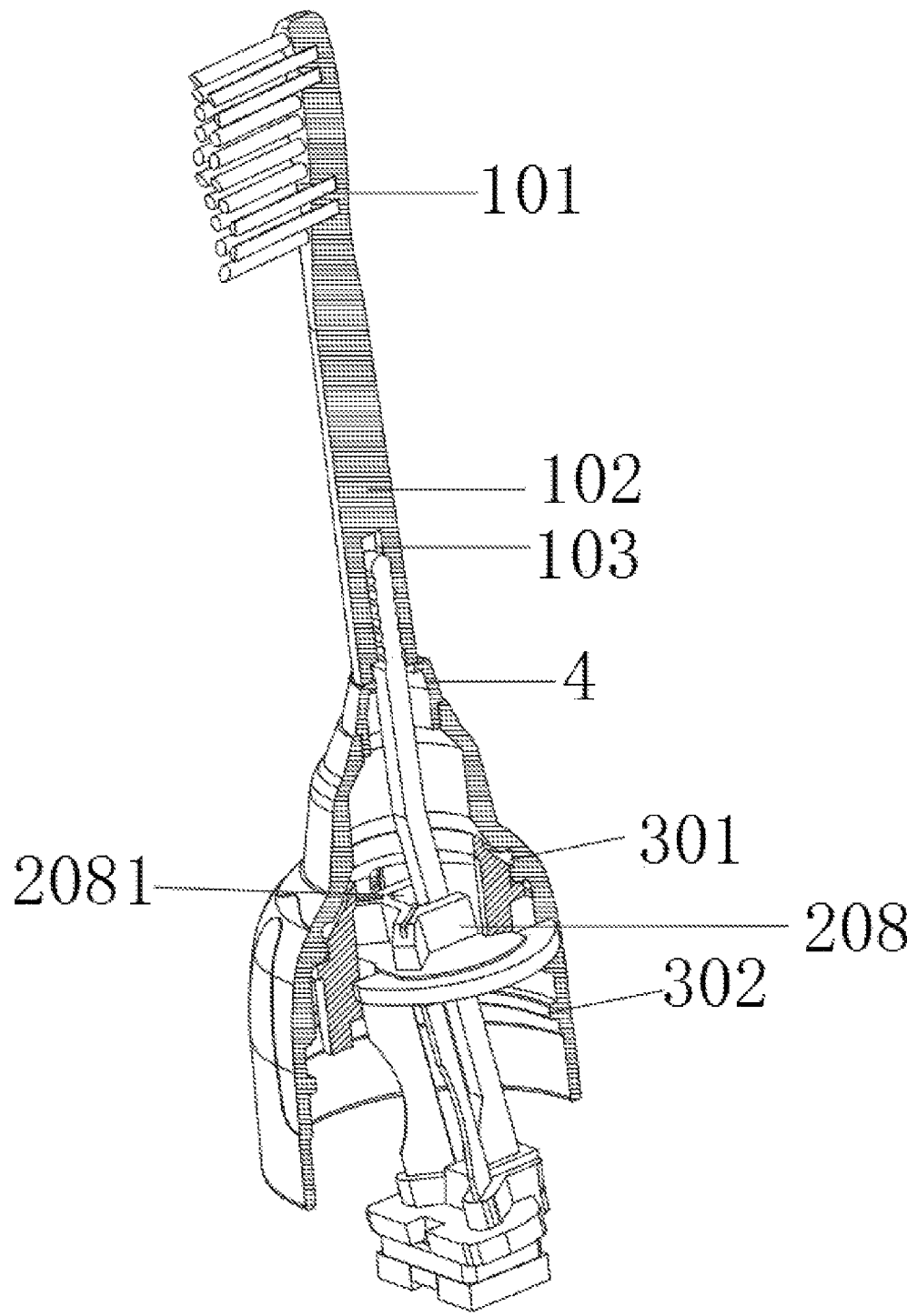
FIG. 2 illustrates a sectional diagram of the electric toothbrush replacement head device according to the embodiment of the disclosure.

Reference to FIG. 2, in an illustrated embodiment of the disclosure, the end of the brush head portion 1 is provided with a square shaft mounting hole 103, through which an end of the square shaft 201 is connected to the end of the brush head portion 1.

In an illustrated embodiment of the disclosure, the top end of the square shaft 201 is provided with rippled first threads 202.

In an illustrated embodiment of the disclosure, the space-keeping slot 2071 of the first fixed plate 207 is in a form of a round hole. Therefore, when the square shaft 201 passes through the space-keeping slot 2071, the space-keeping slot 2071 does not contact with the square shaft 201, thereby to avoid affecting the vibration effect.

In the embodiment of the disclosure, the electric toothbrush replacement head device mainly includes the brush head portion 1, the vibration assembly 2 and the rotating cover 3. The toothbrush head 101 of the brush head portion 1 is provided with a number of round holes, on which a number of bundles of toothbrush bristles are provided. The end of the brush head portion 1 is cylindrical, and the end of the brush head portion 1 is provided with the square shaft mounting hole 103 therein, which is connected to the top end of the square shaft 201 of the vibration assembly 2 to transmit drive force. In an illustrated embodiment of the disclosure, the square shaft 201 is 2.5 centimeters (cm) in length and 1.95 millimeters (mm) in thickness.

A top portion of the square shaft 201 is provided with rippled first threads 202 thereon, which are in contact with side walls of the square shaft mounting hole 103 to generate friction to lock the brush head portion 1 from loosening.

Figure 3:
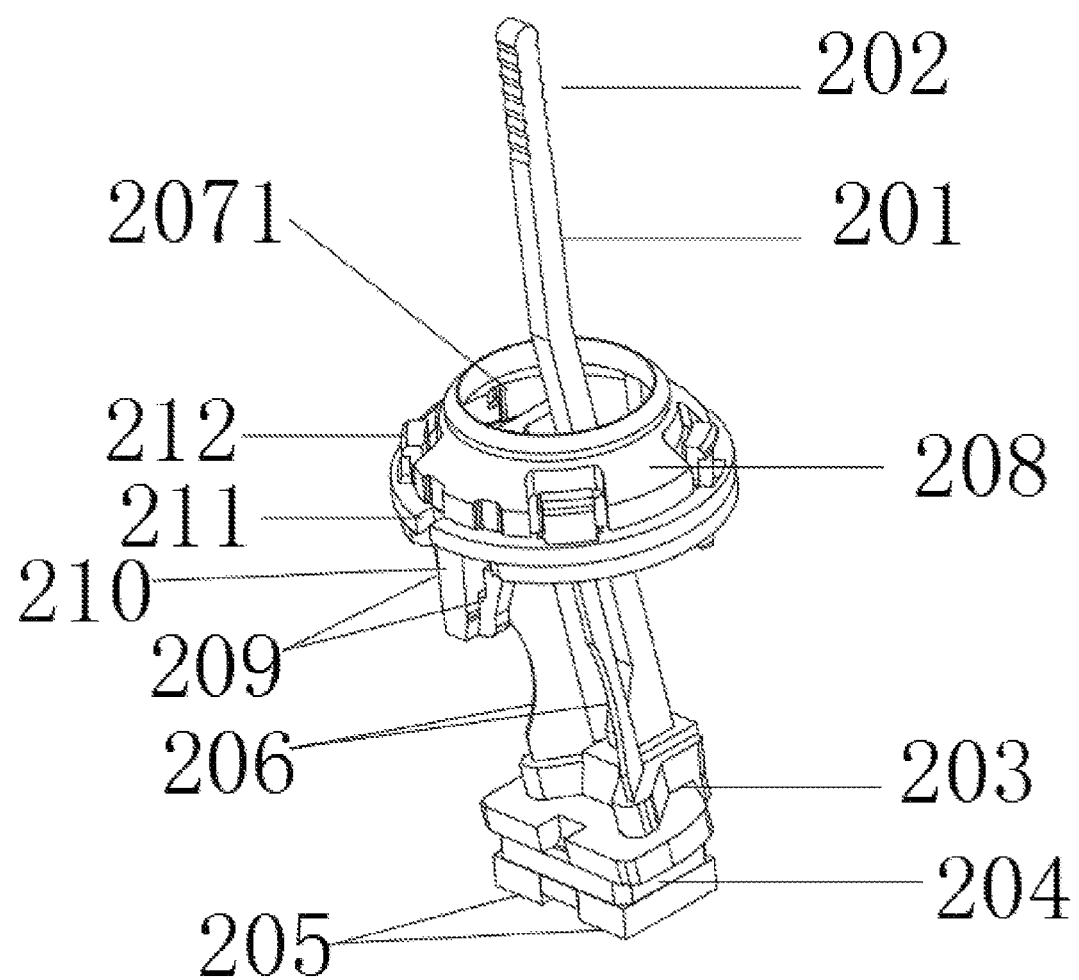
FIG. 3 illustrates a schematic structural diagram of a vibration assembly of the electric toothbrush replacement head device according to an embodiment of the disclosure.
Figure 4:
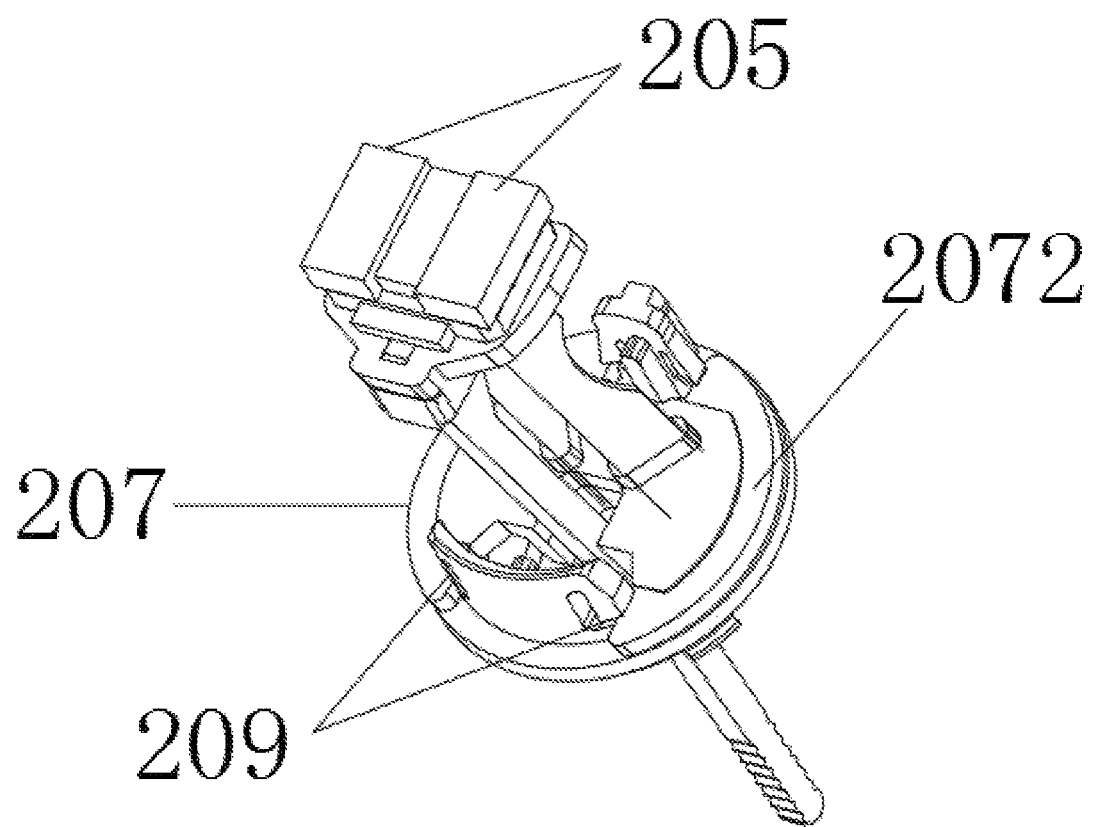
FIG. 4 illustrates another schematic structural diagram of the vibration assembly of the electric toothbrush replacement head device according to an embodiment of the disclosure.

Reference to FIG. 3 and FIG. 4, in an illustrated embodiment of the disclosure, a bottom of the connecting seat 203 is provided with a weighted iron block 204 thereon.

In an illustrated embodiment of the disclosure, the weighted iron block 204 is provided with at least one magnet 205.

Reference to FIG. 1, FIG. 2, FIG. 3, FIG. 4 and FIG. 7, in an illustrated embodiment of the disclosure, two semi-circular grooves are disposed on the bottom end of the square shaft 201, namely a first semi-circular groove 2031 and a second semi-circular groove 2032; a top portion of the connecting seat 203 is provided with two protruding parts matched with the two semi-circular grooves disposed on the bottom end of the square shaft 201 correspondingly; and the connecting seat 203 is abutted against the bottom end of the square shaft 201 through the two semi-circular grooves.

In an illustrated embodiment of the disclosure, the connecting seat 203 is provided with at least one fixed metal sheet 206 thereon; one end of the at least one fixed metal sheet 206 is connected to the first fixed plate 207; and an opposite end of the at least one fixed metal sheet 206 is connected to the connecting seat 203.

Reference to FIGS. 3-7, in the embodiment of the disclosure, the bottom end of the square shaft 201 of the vibration assembly 2 is fixed on the connecting seat 203; the bottom end of the square shaft 201 is provided with the first semi-circular groove 2031 and the second semi-circular groove 2032, and the connecting seat 203 is provided with the two protruding parts matched with the two semi-circular grooves respectively, therefore, the two protruding parts are respectively abutted against the two semi-circular grooves to connect the connecting seat 203 to the bottom end of the square shaft 201. In an illustrated embodiment of the disclosure, the first semi-circular groove 2031 and the second semi-circular groove 2032 are injection-molded into the square shaft 201 to strengthen the structure of the square shaft 201.

The connecting seat 203 is provided with the weighted iron block 204 at its bottom; the weighted iron block 204 is 14 mm in length, 10.6 mm in width and 1.6 mm in thickness, as well as weighs 1.5 grains (g). The weighted iron block 204 enhances oscillation of the vibration assembly 2 when working to achieve the vibration strengthening effect and improve the efficiency of the electric toothbrush in cleaning teeth when brushing.

The weighted iron block 204 is provided with at least one magnet 205 thereon, in an illustrated embodiment of the disclosure, the weighted iron block 204 is provided with two magnets; and each of the two magnets 205 is 10 mm in length, 5 mm in width and 2.6 mm in thickness.

The magnet 205 is a strong magnet that interacts with electromagnetic generated by main engine 5, thereby to perform a displacement movement to provide power for the vibration of the vibration assembly 2.

The connecting seat 203 is provided with at least one fixed metal sheet 206 thereon, in an illustrated embodiment of the disclosure, the connecting seat 203 is provided with two fixed metal sheets in the same shape and size. Each of the two fixed metal sheets 206 is 37.4 mm in length, 4.9 mm in width and about 0.5 mm in thickness. One end of the fixed metal sheet 206 is connected to the first fixed plate 207, and the other end is connected to the connecting seat 203. Two ends of the fixed metal sheet 206 are provided with two circular grooves to strengthen the connection with other components. The fixed metal sheet 206 is made of stainless steel to ensure the strength and vibration effect.

Reference to FIG. 3 and FIG. 4, in an illustrated embodiment of the disclosure, the first fixed plate 207 is provided with a supporter 208 thereon; the supporter 208 is provided with a supporter hole 2081 thereon; and the square shaft 201 is connected to the end of the brush head portion 1 through the supporter hole 2081. In an illustrated embodiment of the disclosure, the supporter hole 2081 corresponds to a position of the space-keeping slot 2071, and the supporter hole 2081 is disposed on the space-keeping slot 2071.

Reference to FIG. 2, FIG. 3, FIG. 4 and FIG. 6, in an illustrated embodiment of the disclosure, the supporter 208 is provided with first buckles 212 thereon; the rotating cover 3 is provided with circular slots 301 therein; and the first buckles 212 are buckled in the circular slots 301. In an illustrated embodiment of the disclosure, the supporter 208 is provided with a plurality of the first buckles 212, and in the embodiment of the disclosure, the supporter 208 is provided with four first buckles 212.

In an embodiment of the disclosure, the rotating cover 3 is provided with second threads therein; the first buckles 212 are matched with the circular slots disposed in the rotating cover 3; and the rotating cover 3 is buckled in the circular slots 301 through the first buckles 212 to make the vibration assembly 2 install on the rotating cover 3. At the same time, the supporter 208 is capable of sliding and rotating along the circular slots 301, so that the rotating cover 3 can be fixed by rotating the second threads 302 during the installation.

In the embodiment of the disclosure, the second threads 302 disposed in the inner side of the rotating cover 3 are used to fix the electric toothbrush replacement head device on the main engine 5.

In an illustrated embodiment of the disclosure, an edge of the supporter 208 is provided with a drainage slot 211. The drainage slot 211 is disposed next to one of the first buckles 212. When brushing teeth, water seeps into the toothbrush head portion 1, and then the water seeps into the rotating cover 3, the drainage slot 211 can drain the water and prevent the water from accumulating, which adversely affects the disclosure.

Reference to FIG. 2, FIG. 3, FIG. 4 and FIG. 6, in an illustrated embodiment of the disclosure, a back side of the first fixed plate 207 is provided with a second fixed plate 2072 and second buckles 209 thereon; and the second buckles 209 are buckled on the second fixed plate 2072.

In the embodiment of the disclosure, the back side of the first fixed plate 207 is provided with the second fixed plate 2072 and the second buckles 209 thereon, so that the first fixed plate 207 is used more suitably and safely. In an illustrated embodiment of the disclosure, the number of the second buckles 209 is four, two of which are disposed on the fixed plate 2072 as a group.

In an illustrated embodiment of the disclosure, a positioning rib 210 is disposed on the second buckles 209, and the positioning rib 210 is disposed on an outside of the second buckles 209. Specially, reference to FIG. 3, the group of the two second buckles are located at a same side of the second fixed plate, and the positioning rib 210 is disposed on an outside of the group of the two second buckles 209.

Figure 5:
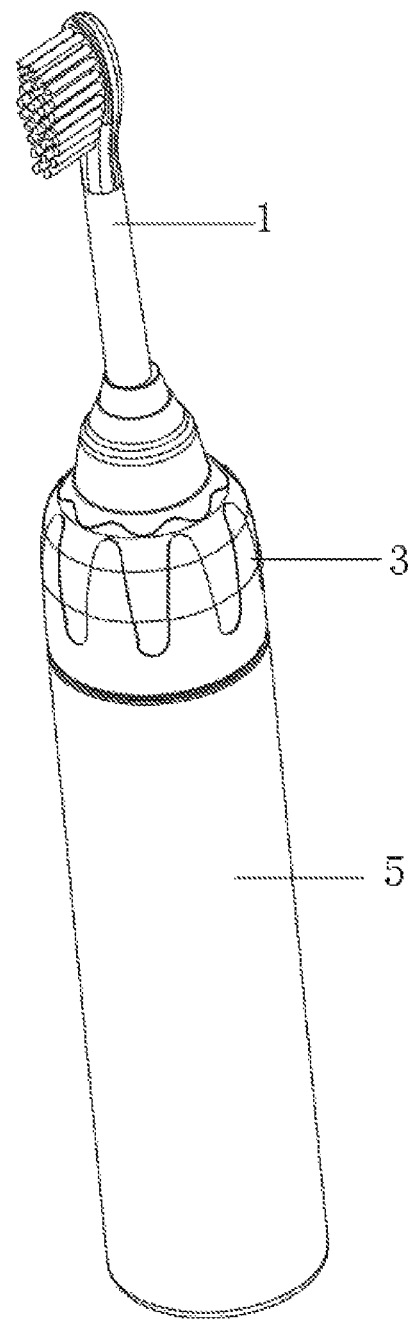
FIG. 5 illustrates a schematic structural diagram of an electric toothbrush of the electric toothbrush replacement head device according to an embodiment of the disclosure.
Figure 6:
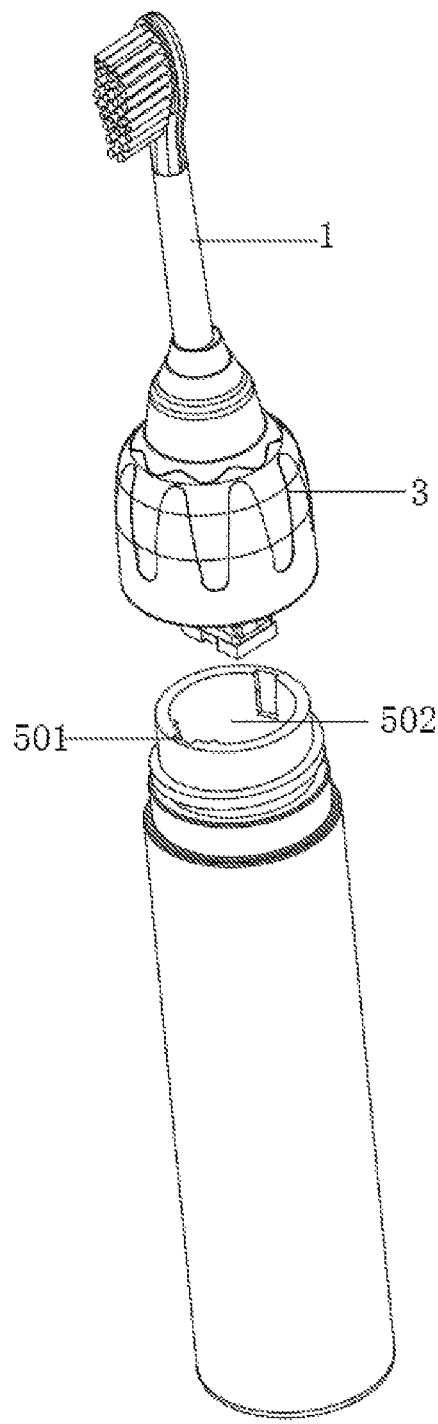
FIG. 6 illustrates a disassembled schematic diagram of the electric toothbrush of the electric toothbrush replacement head device according to an embodiment of the disclosure.
Figure 7:
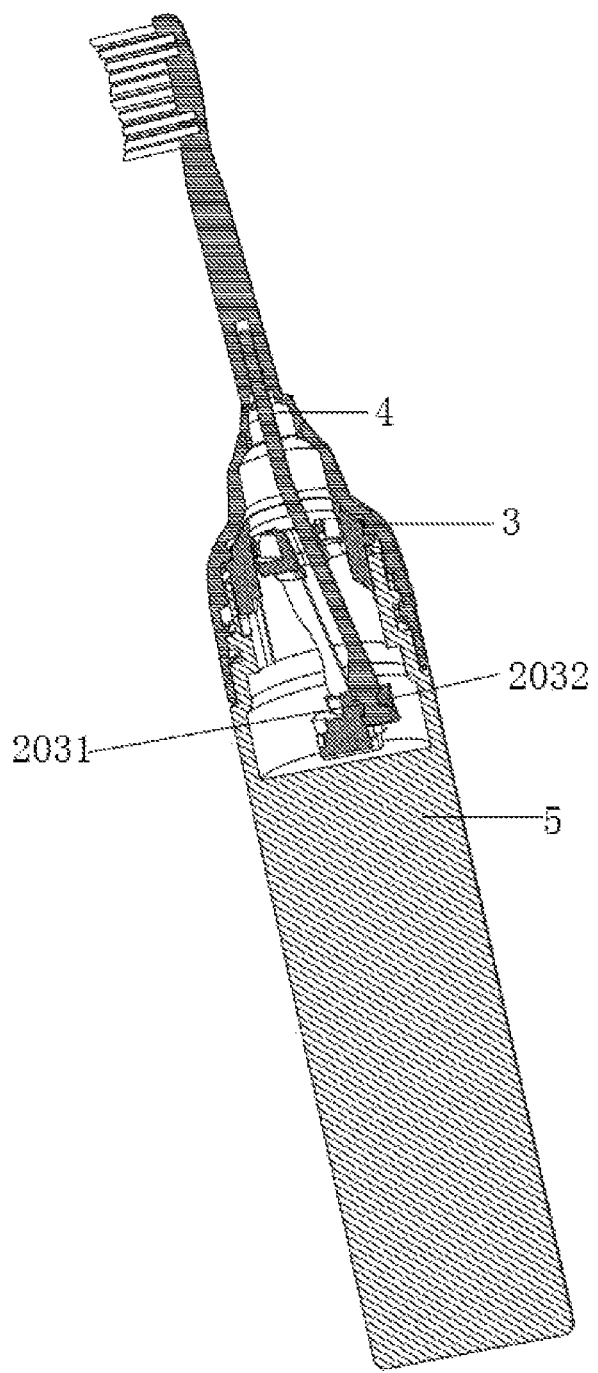
FIG. 7 illustrates a sectional diagram of the electric toothbrush of the electric toothbrush replacement head device according to an embodiment of the disclosure.

Reference to FIG. 5 and FIG. 6, in the embodiment of the disclosure, a top portion of the main engine 5 is provided with an installing groove 502 therein, and a positioning slot 501 is disposed on an edge of the installing groove 502. The connecting seat 203 is disposed in the installing groove 502, and the positioning rib 210 is buckled in the positioning slot 501.

When the disclosure is used, the electric toothbrush replacement head device of the disclosure is inserted into the installing groove 502 disposed on the main engine 5, and the rotating cover 3 is rotated to make the connecting seat 203 of the vibration assembly 2 be disposed in the installing groove 502. At this time, screwing the rotating cover 3, the second threads 302 inside the rotating cover 3 interact with third threads disposed on the main engine 5 to clamp the first fixed plate 207 to fix the electric toothbrush replacement head device.

Reference to FIG. 1 and FIG. 2, a soft rubber 4 sleeve is disposed between the rotating cover 3 and the end of the brush head portion 1.

The rotating cover 3 has an opening thereon, the opening is provided with the soft rubber sleeve 4, which is connected to the opening at both ends for the square shaft 201 to pass. The soft rubber sleeve 4 is a soft rubber structure, therefore, when the brush head portion 1 vibrates, the soft rubber sleeve 4 plays a role in cushioning effect, and provides a protection to prevent the fiction among the end of the brush head portion 1, the square shaft 201, and the outer shell. The disclosure avoids wear and tear and improves its service life.

When the electric toothbrush replacement head device is installed, the main engine 5 is turned on to generate the electromagnetism, and the magnet 205 oscillates under the magnetic force to drive the weighted iron block 204, the connecting seat 203, the square shaft 201 and other parts to co-vibrate. And the vibration is transmitted to the brush head portion 1 through the square shaft 201, thereby to make the toothbrush bristles placed on an implant surface of the toothbrush head 101 oscillate to achieve the purpose of cleaning the teeth.

The electric toothbrush replacement head device of the disclosure optimizes the original design with simpler structure, simpler installation, higher transmission efficiency and better cleaning effect.

The above descriptions are only the illustrated embodiments of the disclosure, but the scope of the protection of the disclosure is not limited to them. All equivalent structural transformations made under the concept of the disclosure, using the contents of the specification of the disclosure and the attached drawings, or applied directly/indirectly in other related technical fields are included in the scope of the protection of the disclosure.

What is claimed is:

1. An electric toothbrush replacement head device, comprising:
   a brush head portion (1), wherein the brush head portion (1) comprises a toothbrush handle (102) and a toothbrush head (101);
   a rotating cover (3), disposed adjacent to an end of the brush head portion (1);
   a vibration assembly (2), disposed in the rotating cover (3); and
   wherein the vibration assembly (2) comprises a first fixed plate (207), a size of which corresponds to an inner diameter of the rotating cover (3); the first fixed plate (207) is provided with a space-keeping slot (2071) therein and a square shaft (201) thereof; a bottom of the first fixed plate (207) is provided with a connecting seat (203);
   a top end of the square shaft (201) is connected to the end of the brush head portion (1) through the space-keeping slot (2071); and a bottom end of the square shaft (201) opposite to the top end of the square shaft (201) is connected to the connecting seat (203);
   wherein the vibration assembly (2) comprises buckle assemblies disposed on the first fixed plate (207) and located at two opposite sides of the first fixed plate (207); each of the buckle assemblies comprises: a main part and two buckles (209) connected to two sides of the main part, and each of the two buckles (209) extends from a side of the main part facing away from the first fixed plate (207) to the first fixed plate (207), and a gap is provided between each buckle (209) and the first fixed plate (207), each buckle assembly is configured to match with a groove of a main engine (5), thereby to make the two buckles (209) of each buckle assembly be buckled in the groove of the main engine (5).

2. The electric toothbrush replacement head device according to claim 1, wherein the end of the brush head portion (1) is provided with a square shaft mounting hole (103) and the top end of the square shaft (201) passes through the square shaft mounting hole (103) to connect to the end of the brush head portion (1).

3. The electric toothbrush replacement head device according to claim 1, wherein the top end of the square shaft (201) is provided with rippled first threads (202) thereon.

4. The electric toothbrush replacement head device according to claim 1, wherein a bottom of the connecting seat (203) is provided with a weighted iron block (204) thereon.

5. The electric toothbrush replacement head device according to claim 4, wherein the weighted iron block (204) is provided with at least one magnet (205) thereon.

6. The electric toothbrush replacement head device according to claim 1, wherein two semi-circular grooves are disposed on the bottom end of the square shaft (201), a top portion of the connecting seat (203) is provided with two protruding parts matched with the two semi-circular grooves correspondingly; and the two protruding parts are respectively abutted against the two semi-circular grooves to connect the connecting seat (203) to the bottom end of the square shaft (201).

7. The electric toothbrush replacement head device according to claim 1, wherein the connecting seat (203) is provided with at least one fixed metal sheet (206) thereon; an end of the at least one fixed metal sheet (206) is connected to the first fixed plate (207); and an opposite end of the at least one fixed metal sheet (206) is connected to the connecting seat (203).

8. The electric toothbrush replacement head device according to claim 1, wherein a back side of the first fixed plate (207) is provided with a second fixed plate (2072).

9. The electric toothbrush replacement head device according to claim 1, wherein one of the buckle assemblies comprises a positioning rib (210); and the positioning rib (210) is disposed on an outside of the main part and located between the two buckles (209), the positioning rib (210) is configured to match with a positioning slot (501) opened on the groove of the main engine (5), thereby to position the electric toothbrush replacement head device.

10. The electric toothbrush replacement head device according to claim 1, wherein a soft rubber sleeve (4) is disposed between the rotating cover (3) and the end of the brush head portion (1).

11. The electric toothbrush replacement head device according to claim 1, wherein the vibration assembly (2)

further comprises a supporter (208) disposed on the first fixed plate (207), and connecting buckles (212) disposed on the supporter (208);

wherein the connecting buckles (212) and the buckles (209) of the buckle assemblies are located at two opposite sides of the first fixed plate (207), and each of the connecting buckles (212) extends from the first fixed plate (207) to the brush head portion (1); and wherein the supporter (208) is provided with a supporter hole (2081) thereon; and the square shaft (201) passes through the supporter hole (2081) to connect to the end of the brush head portion (1).

12. The electric toothbrush replacement head device according to claim 11, wherein the rotating cover (3) is provided with circular slots (301) therein; and the connecting buckles (212) are buckled in the circular slots (301).

13. The electric toothbrush replacement head device according to claim 11, wherein an edge of the supporter (208) is provided with a drainage slot (211).

14. An electric toothbrush replacement head device, comprising:

a brush head portion (1);

a rotating cover (3), disposed adjacent to an end of the brush head portion (1);

a vibration assembly (2), disposed in the rotating cover (3); and wherein the vibration assembly (2) comprises: a first fixed plate (207) abutted against an inner wall of the rotating cover (3), a square shaft (201) inserted in the first fixed plate (207), and a connecting seat (203) disposed on a bottom end of the square shaft (201); the bottom end connected to the connecting seat (203) of the square shaft (201) is provided with two semi-circular grooves matched with two protruding parts provided on a top portion of the connecting seat (203), thereby making the connecting seat (203) be abutted against the bottom end of the square shaft (201) through the two semi-circular grooves.

15. The electric toothbrush replacement head device according to claim 14, wherein the vibration assembly (2) comprises buckle assemblies disposed on the first fixed plate (207) and located at two opposite sides of the first fixed plate (207); each of the buckle assemblies comprises: a main part and two buckles (209) connected to two sides of the main part, and each of two buckles (209) extends from a side of the main part facing away from the first fixed plate (207) to the first fixed plate (207), and a gap is provided between each buckle (209) and the first fixed plate (207), each buckle assembly is configured to match with a groove of a main engine (5), thereby to make the two buckles (209) of each buckle assembly be buckled in the groove of the main engine (5).

16. The electric toothbrush replacement head device according to claim 15, wherein the vibration assembly (2) comprises a supporter (208) disposed on the first fixed plate (207) and connecting buckles (212) disposed on the supporter (208);

wherein the connecting buckles (212) and the buckles (209) of the buckle assemblies are located at two opposite sides of the first fixed plate (207), and each of the connecting buckles (212) extends from the first fixed plate (207) to the brush head portion (1); and wherein the rotating cover (3) is provided with circular slots (301) therein, and the connecting buckles (212) are buckled in the circular slots (301).

17. The electric toothbrush replacement head device according to claim 15, wherein one of the buckle assemblies comprises a positioning rib (210); and the positioning rib (210) is disposed on an outside of the main part and located between the two buckles (209), the positioning rib (210) is configured to match with a positioning slot (501) opened on the groove of the main engine (5), thereby to position the electric toothbrush replacement head device.

18. The electric toothbrush replacement head device according to claim 14, wherein the vibration assembly (2) further comprises: a supporter (208) disposed on the first fixed plate (207), connecting buckles (212) disposed on the supporter (208) to extend from a side of the first fixed plate (207), buckles (209) disposed on an opposite side of the first fixed plate (207), and a drainage slot (211) disposed on an edge of the supporter (208).

\* \* \* \* \*